(12) United States Patent
Berczik et al.

(10) Patent No.: US 9,890,088 B2
(45) Date of Patent: Feb. 13, 2018

(54) PRECERAMIC POLYMER FOR CERAMIC INCLUDING METAL BORIDE

(71) Applicant: United Technologies Corporation, Farmington, CT (US)

(72) Inventors: Douglas M. Berczik, Manchester, CT (US); Michael A. Kmetz, Colchester, CT (US); Steve Lawrence Suib, Storrs, CT (US); Justin Reutenauer, Branford, CT (US); Timothy Coons, Narragansett, RI (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/028,951

(22) PCT Filed: Oct. 2, 2014

(86) PCT No.: PCT/US2014/058719
§ 371 (c)(1),
(2) Date: Apr. 13, 2016

(87) PCT Pub. No.: WO2015/057394
PCT Pub. Date: Apr. 23, 2015

(65) Prior Publication Data
US 2016/0236987 A1    Aug. 18, 2016

Related U.S. Application Data

(60) Provisional application No. 61/890,969, filed on Oct. 15, 2013.

(51) Int. Cl.
| | | |
|---|---|---|
| *C04B 35/565* | (2006.01) | |
| *C04B 35/58* | (2006.01) | |
| *C08G 77/62* | (2006.01) | |
| *C04B 35/626* | (2006.01) | |
| *C04B 35/632* | (2006.01) | |
| *C08G 77/60* | (2006.01) | |
| *C08G 77/398* | (2006.01) | |

(52) U.S. Cl.
CPC .. *C04B 35/58021* (2013.01); *C04B 35/58064* (2013.01); *C04B 35/58071* (2013.01); *C04B 35/58078* (2013.01); *C04B 35/6267* (2013.01); *C04B 35/6269* (2013.01); *C04B 35/6325* (2013.01); *C08G 77/398* (2013.01); *C08G 77/60* (2013.01); *C08G 77/62* (2013.01); *C04B 2235/3409* (2013.01); *C04B 2235/3804* (2013.01); *C04B 2235/3813* (2013.01); *C04B 2235/3856* (2013.01); *C04B 2235/441* (2013.01); *C04B 2235/483* (2013.01); *C04B 2235/486* (2013.01); *C04B 2235/80* (2013.01)

(58) Field of Classification Search
CPC . C04B 35/565; C04B 35/571; C04B 35/6227; C04B 35/57
See application file for complete search history.

(56) References Cited

U.S. PATENT DOCUMENTS

| | | | |
|---|---|---|---|
| 4,327,186 A | 4/1982 | Murata et al. | |
| 4,482,669 A | 11/1984 | Seyferth et al. | |
| 4,906,710 A | 3/1990 | Burns et al. | |
| 5,180,533 A | 1/1993 | Kamiya et al. | |
| 5,256,487 A * | 10/1993 | Myers | C04B 35/571 |
| | | | 428/446 |
| 5,279,780 A | 1/1994 | Lipowitz et al. | |
| 5,332,701 A | 7/1994 | Bryson et al. | |
| 5,386,006 A | 1/1995 | Matsumoto et al. | |
| 5,415,812 A | 5/1995 | Durbut et al. | |
| 5,436,398 A | 7/1995 | Shimizu et al. | |
| 6,146,559 A | 11/2000 | Zank | |
| 8,357,623 B2 | 1/2013 | Lillo et al. | |
| 8,409,491 B1 | 4/2013 | Stackpoole et al. | |
| 2006/0084566 A1 | 4/2006 | Wan et al. | |

FOREIGN PATENT DOCUMENTS

| | | |
|---|---|---|
| JP | S58213023 | 12/1983 |
| WO | 2013119806 | 8/2013 |

OTHER PUBLICATIONS

International Search Report and Written Opinion for PCT Application No. PCT/US2014/058719, dated Jan. 15, 2015.
International Preliminary Report on Patentability for PCT Application No. PCT/US2014/058719 dated Apr. 19, 2016.
Siwei, L., Zhang, L., Huang, M., Yu, Z, Xia, H., Feng, Z., Cheng, L. (2012). In situ synthesis and microstructure characterization of $TiC\text{-}TiB_2\text{-}SiC$ ultrafine composites from hybrid precursor. Materials Chemistry and Physics 133 (2012) pp. 946-953.
Extended European Search Report for European Patent Application No. 14854013.1 dated May 15, 2017.

* cited by examiner

*Primary Examiner* — Noah S Wiese
(74) *Attorney, Agent, or Firm* — Carlson, Gaskey & Olds, P.C.

(57) ABSTRACT

Disclosed is a method of fabricating a preceramic polymer for making a ceramic material including a metal boride. The method includes providing a starting preceramic polymer that includes a silicon-containing backbone chain and first and second reactive side groups extending off of the silicon-containing backbone chain, reacting a boron-containing material with the first reactive side group to bond a boron moiety to the silicon-containing backbone chain, and reacting a metal-containing material with the second reactive side group to bond a metal moiety to the silicon-containing backbone chain such that the preceramic polymer includes the boron moiety and the metal moiety extending as side groups off of the silicon-containing backbone chain. Also disclosed is a preceramic polymer composition and a metal-boride-containing ceramic article fabricated from the preceramic polymer.

15 Claims, No Drawings

PRECERAMIC POLYMER FOR CERAMIC INCLUDING METAL BORIDE

This application claims priority to U.S. Provisional Application No. 61/890,969, filed Oct. 15, 2014.

BACKGROUND

This disclosure relates to ceramic, metal-boride-containing materials.

Metal borides, such as titanium diboride ($TiB_2$), are used as monolithic structures and in ceramic composite materials. One method of fabricating titanium diboride includes hot pressing a mixture of titanium and boron at a temperature of greater than 2300° C. to react the titanium and the boron to form titanium diboride. This method is limited to forming monolithic structures of titanium diboride because the high required reaction temperature is incompatible with processing temperatures of most other materials of interest.

One known ceramic composite material includes silicon carbide (SiC) and titanium diboride. A method of fabricating this material includes mixing powders of silicon carbide and titanium diboride together, and hot pressing the mixture at high temperature/pressure to form a sintered body. However, because of inherent limitations in hot pressing, the shape of the sintered body is limited to relatively simple geometries.

SUMMARY

A method of fabricating a preceramic polymer for making a ceramic material including a metal boride according to an example of the present disclosure includes providing a starting preceramic polymer that includes a silicon-containing backbone chain and first and second reactive side groups extending off of the silicon-containing backbone chain. A boron-containing material is reacted with the first reactive side group to bond a boron moiety to the silicon-containing backbone chain. A metal-containing material is reacted with the second reactive side group to bond a metal moiety to the silicon-containing backbone chain such that the preceramic polymer includes the boron moiety and the metal moiety extending as side groups off of the silicon-containing backbone chain.

In a further embodiment of any of the foregoing embodiments, the boron-containing material is a borate compound.

In a further embodiment of any of the foregoing embodiments, the metal of the metal-containing material is a refractory metal.

In a further embodiment of any of the foregoing embodiments, the metal of the metal-containing material is selected from the group consisting of refractory metals.

In a further embodiment of any of the foregoing embodiments, the refractory metal is titanium.

In a further embodiment of any of the foregoing embodiments, the refractory metal is zirconium.

In a further embodiment of any of the foregoing embodiments, the boron-containing material is a borate compound and the metal-containing material is a metal alkoxide.

In a further embodiment of any of the foregoing embodiments, the first reactive side group is a N—H moiety and the second reactive side groups is a Si—H moiety.

In a further embodiment of any of the foregoing embodiments, the starting preceramic polymer is selected from the group consisting of polysilazane, polysilane, polysiloxane and combinations thereof.

In a further embodiment of any of the foregoing embodiments, the boron moiety and the metal moiety are bonded off of silicon atoms in the silicon-containing backbone chain.

A preceramic polymer composition according to an example of the present disclosure includes a silicon-containing backbone chain including a boron moiety and a metal moiety extending as side groups off of the silicon-containing backbone chain.

In a further embodiment of any of the foregoing embodiments, the silicon-containing backbone chain is selected from the group consisting of polysilazane, polysilane, polysiloxane and combinations thereof.

In a further embodiment of any of the foregoing embodiments, the boron moiety is a borate compound.

In a further embodiment of any of the foregoing embodiments, the metal of the metal moiety is selected from the group consisting of refractory metals.

In a further embodiment of any of the foregoing embodiments, the refractory metal is titanium.

In a further embodiment of any of the foregoing embodiments, the refractory metal is zirconium.

In a further embodiment of any of the foregoing embodiments, the boron moiety and the metal moiety are bonded off of silicon atoms in the silicon-containing backbone chain.

A ceramic article according to an example of the present disclosure includes a non-boride ceramic phase and a plurality of metal-boron bond regions molecularly dispersed through the non-boride ceramic phase.

In a further embodiment of any of the foregoing embodiments, the metal is selected from the group consisting of refractory metals.

In a further embodiment of any of the foregoing embodiments, the metal is selected from the group consisting of titanium, zirconium and combinations thereof.

DETAILED DESCRIPTION

Metal borides and metal-boride-containing ceramic composites (collectively "metal-boride materials") are desirable for, inter alia, good wear resistance, high temperature resistance, corrosion resistance etc., particularly in aerospace and aircraft applications. Use of metal-boride materials is limited by the fabrication techniques by which metal boride itself can be formed and by which metal-boride materials can be formed into a desired end-use geometry. For example, powder processing and sintering, such a hot pressing, is limited to the formation of relatively simple geometries due to constraints in powder compaction.

Another ceramic processing technique involves a preceramic polymer, which can be formed, by infiltration, into complex shapes. The preceramic polymer is then thermally converted into a ceramic material. Preceramic polymers can be used in what is known as polymer infiltration and pyrolysis ("PIP") to form fiber-reinforced ceramic matrix composites.

Although metal-boride material could be useful in end-use articles as monolithic ceramics, ceramic composites, coatings and other applications, there are challenges in using metal borides in preceramic polymer processing to fabricate polymer-derived metal boride materials for such articles. For example, typically metal and boron react to form metal boride at temperatures greater than 1800° C., which is beyond the pyrolysis temperature (usually approximately 1600° C.) of many silicon-based preceramic polymers of interest. Thus, the in-situ formation of metal boride in preceramic polymer processing is unfeasible.

Alternatively, a prefabricated metal boride powder could be added to a preceramic polymer prior to pyrolysis. However, the high density of the metal boride causes the powder to fall out of suspension in the polymer, which causes poor dispersion and unsuitable properties of the ceramic composite. Thus, the incorporation of metal boride filler is also unfeasible.

As will be described in further detail, the approach disclosed herein chemically incorporates metal and boron into a preceramic polymer such that, upon pyrolysis of the preceramic polymer, the resulting ceramic material includes molecularly distributed metal boride. In this regard, disclosed herein is a preceramic polymer composition, a method of fabricating the composition and an article formed from the pyrolysis of the composition.

The preceramic polymer composition includes a silicon-containing backbone chain that has a boron moiety and a metal moiety extending as side groups off of the silicon-containing backbone chain. In one example, the silicon-containing backbone chain is selected from polysilazane, polysilane, polysiloxane or combinations thereof.

In further examples, the boron moiety is a borate compound. In one further example, the boron moiety and the metal moiety are bonded off of silicon atoms in the silicon-containing backbone chain.

In further examples, the metal of the metal moiety is selected from refractory metals. Refractory metals include niobium, molybdenum, tantalum, tungsten, rhenium, titanium, vanadium, chromium, zirconium, hafnium, ruthenium, osmium, iridium and combinations thereof.

An example method of fabricating the preceramic polymer includes providing a starting preceramic polymer that includes the silicon-containing backbone chain such as polysilazane, polysilane, polysiloxane or combinations thereof and first and second reactive side groups extending off of the silicon-containing backbone chain, reacting a boron-containing material with the first reactive side group to bond a boron moiety to the silicon-containing backbone chain, and reacting a metal-containing material with the second reactive side group to bond a metal moiety to the silicon-containing backbone chain such that the preceramic polymer includes the boron moiety and the metal moiety extending as side groups off of the silicon-containing backbone chain.

One example chemical structure of the composition, based on polysilazane, a borate compound and titanium as the refractory metal, is shown below in Structure I below.

Structure I:

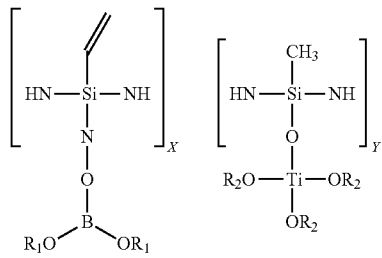

The reactive side groups can be varied, depending on the starting preceramic polymer, boron-containing material and metal-containing material. In one example, the first reactive side group is a N—H (nitrogen-hydrogen) moiety and the second reactive side group is a Si—H (silicon-hydrogen) moiety. The boron-containing material can be a borate compound and the metal-containing material can be an alkoxide of the refractory metal. The borate compound is reactive with the N—H moiety and the refractory metal alkoxide is reactive with the Si—H moiety. The metal alkoxide and borate are bound on an atomic level to the preceramic polymer to ultimately form a titanium boride material upon pyrolysis. This allows for a uniform, molecular distribution of the refractory metal boride after pyrolysis. That is, the dispersion is at the molecular level where the metal-boron bonds are dispersed through the resulting ceramic material.

In one example, the starting preceramic polymer is polysilazane with Si—H and N—H moieties. A borate compound is used to bond a boron moiety to the N—H moiety, as shown below in example Equation 1.

Equation 1:

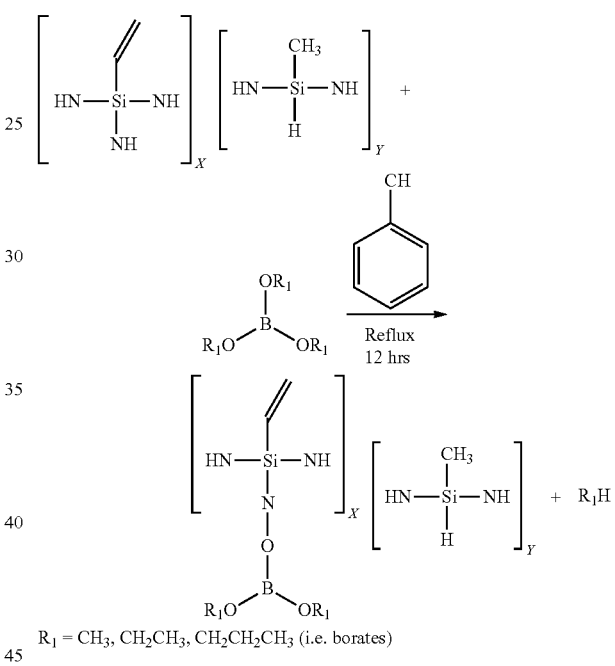

$R_1 = CH_3, CH_2CH_3, CH_2CH_2CH_3$ (i.e. borates)

The boron-containing material is not limited to a borate compound, and other boron-containing material that is reactive with the N—H moiety could be used.

The second reaction used a titanium alkoxide to bond a titanium moiety to the Si—H moiety, as shown below in example Equation 2.

Equation 2:

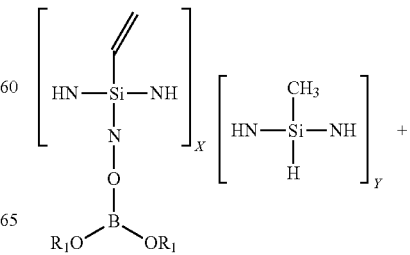

-continued

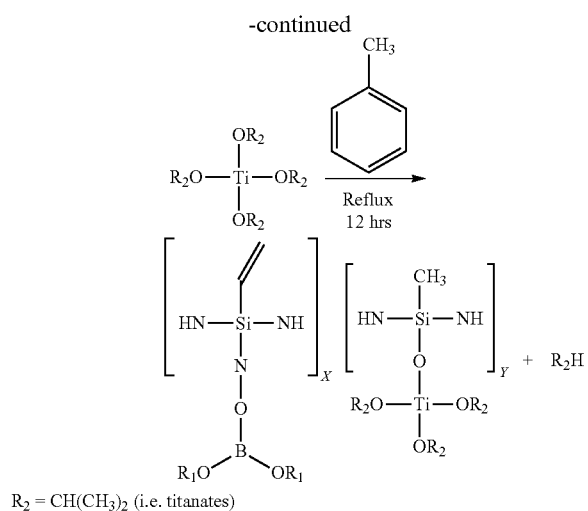

$R_2 = CH(CH_3)_2$ (i.e. titanates)

It should be noted that this reaction is not limited to titanium, and other refractory metal alkoxides could be used or other refractory-metal-containing material that is reactive with the Si—H moiety could be used.

Once the preceramic polymer containing both boron and metal moieties has been prepared the polymer can then be pyrolyzed at a temperature-time-atmosphere combination that allows the metal-boron reaction to take place In one example a polyvinylsilazane based polymer was cured by heating the polymer to 300° C. at 2° C./min under house nitrogen. The cured polymer was then pyrolyzed in an argon atmosphere at a heating rate of 2° C./min to 1600° C. and held at the final temperature for 2 hours. The XRD patterns taken of the polymer were used to confirm the presence of $TiB_2$.

Using different ratios of doping precursors to the polysilane, polysilazane, and/or polysiloxane polymer will allow for tailoring the amount resulting boride phase. These ratios include 0.1 mol % to 50 mol % loading of the co-precursors to polymer. A polymer with a silicon backbone is needed for the reaction to yield a boride phase. Pyrolyzing only the titanium alkoxide and the triethyl borate together yields an oxide phase of $TiO_2$. The excess oxygen in the alkoxide and borate precursor reacts with the silicon in the backbone of the polymer to form SiO (g) which is evolved from the polymer. This reaction mechanism is not limited to titanium but can be expanded to other metals.

The preceramic polymer can be used to fabricate ceramic articles, such as ceramic monoliths, ceramic composites, and coatings. The resulting ceramic material derived from thermal conversion of the disclosed preceramic polymer includes a non-boride ceramic phase and a plurality of metal-boron bond regions molecularly dispersed through the non-boride ceramic phase. For example, the non-boride ceramic phase is TiCN with $TiB_2$ molecularly distributed there through.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of fabricating a preceramic polymer for making a ceramic material including a metal boride, the method comprising:
    providing a starting preceramic polymer that includes a silicon-containing backbone chain and first and second reactive side groups extending off of the silicon-containing backbone chain;
    reacting a boron-containing material with the first reactive side group to bond a boron moiety to the silicon-containing backbone chain, wherein the starting preceramic polymer is selected from the group consisting of polysilazane, polysilane, polysiloxane and combinations thereof; and
    reacting a metal-containing material with the second reactive side group to bond a metal moiety to the silicon-containing backbone chain such that the preceramic polymer includes the boron moiety and the metal moiety extending as side groups off of the silicon-containing backbone chain.

2. The method as recited in claim 1, wherein the boron-containing material is a borate compound.

3. The method as recited in claim 1, wherein the metal of the metal-containing material is a refractory metal.

4. The method as recited in claim 3, wherein the metal of the metal-containing material is selected from the group consisting of refractory metals.

5. The method as recited in claim 4, wherein the refractory metal is titanium.

6. The method as recited in claim 4, wherein the refractory metal is zirconium.

7. The method as recited in claim 1, wherein the boron-containing material is a borate compound and the metal-containing material is a metal alkoxide.

8. The method as recited in claim 1, wherein the first reactive side group is a N—H moiety and the second reactive side groups is a Si—H moiety.

9. The method as recited in claim 1, wherein the boron moiety and the metal moiety are bonded off of silicon atoms in the silicon-containing backbone chain.

10. A preceramic polymer composition comprising:
    a silicon-containing backbone chain including a boron moiety and a metal moiety extending as side groups off of the silicon-containing backbone chain, wherein the silicon-containing backbone chain is selected from the group consisting of polysilazane, polysilane, polysiloxane and combinations thereof.

11. The composition as recited in claim 10, wherein the boron moiety is a borate compound.

12. The composition as recited in claim 10, wherein the metal of the metal moiety is selected from the group consisting of refractory metals.

13. The composition as recited in claim 12, wherein the refractory metal is titanium.

14. The composition as recited in claim 12, wherein the refractory metal is zirconium.

15. The composition as recited in claim 10, wherein the boron moiety and the metal moiety are bonded off of silicon atoms in the silicon-containing backbone chain.

* * * * *